(12) United States Patent
Ostraat

(10) Patent No.: US 9,969,621 B2
(45) Date of Patent: May 15, 2018

(54) METHODS FOR PROCESSING FUMED METALLIC OXIDES

(71) Applicant: Saudi Arabian Oil Company, Dhahran (SA)

(72) Inventor: Michele Louisa Ostraat, Somerville, MA (US)

(73) Assignee: Saudi Arabian Oil Company, Dhahran (SA)

( * ) Notice: Subject to any disclaimer, the term of this patent is extended or adjusted under 35 U.S.C. 154(b) by 211 days.

(21) Appl. No.: 15/146,037

(22) Filed: May 4, 2016

(65) Prior Publication Data

US 2017/0320747 A1    Nov. 9, 2017

(51) Int. Cl.
*B01J 2/04* (2006.01)
*B01J 2/18* (2006.01)
(Continued)

(52) U.S. Cl.
CPC ............. *C01B 33/18* (2013.01); *B01J 2/00* (2013.01); *B01J 2/04* (2013.01); *B01J 2/18* (2013.01); *C01B 35/1027* (2013.01); *C01F 7/025* (2013.01); *C01F 17/0043* (2013.01); *C01G 1/02* (2013.01); *C01G 17/02* (2013.01); *C01G 23/047* (2013.01); *C01G 25/02* (2013.01); *C01G 33/00* (2013.01); *C01G 41/02* (2013.01); *C04B 35/626* (2013.01); *C01B 13/14* (2013.01); *C01F 7/02* (2013.01); *C01P 2006/12* (2013.01); *C04B 35/62695* (2013.01)

(58) Field of Classification Search
None
See application file for complete search history.

(56) References Cited

U.S. PATENT DOCUMENTS 3,645,684 A    2/1972   De Cuir
4,684,760 A    8/1987   Drake
(Continued)

FOREIGN PATENT DOCUMENTS

WO    2005016823 A1    2/2005
WO    2016061262 A1    4/2016

OTHER PUBLICATIONS

Maksasithorn, Surasa et al., "Preparation of super-microporous WO3-SiO2 olefin metathesis catalysts by the aerosol-assisted sol-gel process", pp. 125-133, Microporous and Mesoporous Materials 213 (2015).

(Continued)

*Primary Examiner* — Mary Lynn F Theisen
(74) *Attorney, Agent, or Firm* — Dinsmore & Shohl, LLP; Bryan Wisecup

(57) ABSTRACT

Novel methods for processing fumed metallic oxides into globular metallic oxide agglomerates are provided. The methodology may allow for fumed metallic oxide particles, such as fumed silica and fumed alumina particles, to be processed into a globular morphology to improve handling while retaining a desirable surface area. The processes may include providing fumed metallic oxide particles, combining the particles with a liquid carrier to form a suspension, atomizing the solution of suspended particles, and subjecting the atomized droplets to a temperature range sufficient to remove the liquid carrier from the droplets, to produce metallic oxide-containing agglomerations.

28 Claims, 6 Drawing Sheets

(51) Int. Cl.

| | | |
|---|---|---|
| *C01B 13/14* | (2006.01) | |
| *C01B 33/18* | (2006.01) | |
| *C01B 35/10* | (2006.01) | |
| *C04B 35/626* | (2006.01) | |
| *C01F 7/04* | (2006.01) | |
| *C01F 17/00* | (2006.01) | |
| *C01G 1/02* | (2006.01) | |
| *C01G 17/02* | (2006.01) | |
| *C01G 23/04* | (2006.01) | |
| *C01G 25/02* | (2006.01) | |
| *C01G 33/00* | (2006.01) | |
| *C01G 41/02* | (2006.01) | |
| *B01J 2/00* | (2006.01) | |
| *C01F 7/02* | (2006.01) | |
| *C01G 23/047* | (2006.01) | |

(56) References Cited

U.S. PATENT DOCUMENTS

| | | | |
|---|---|---|---|
| 5,204,088 | A | 4/1993 | Noebel et al. |
| 5,340,560 | A | 8/1994 | Rohr et al. |
| 6,551,567 | B2 | 4/2003 | Konya et al. |
| 6,586,785 | B2 | 7/2003 | Flagan et al. |
| 6,723,606 | B2 | 4/2004 | Flagan et al. |
| 6,780,805 | B2 | 8/2004 | Faber et al. |
| 8,097,555 | B2 | 1/2012 | Costa et al. |
| 8,246,933 | B2 | 8/2012 | Jiang et al. |
| 8,415,267 | B2 | 4/2013 | Lee |
| 8,440,874 | B2 | 5/2013 | Ramachandran et al. |
| 8,895,795 | B2 | 11/2014 | Krawezyk et al. |
| 9,586,198 | B2 | 3/2017 | Park et al. |
| 9,682,367 | B2 | 6/2017 | Ali et al. |
| 2005/0118096 | A1 | 6/2005 | Robson et al. |
| 2008/0011876 | A1 | 1/2008 | Ostraat |
| 2010/0286432 | A1 | 11/2010 | Tateno et al. |
| 2011/0077444 | A1 | 3/2011 | Butler |
| 2011/0092757 | A1 | 4/2011 | Akagishi et al. |
| 2012/0039782 | A1* | 2/2012 | Nicholas ............... C01B 13/145 423/263 |
| 2017/0001925 | A1 | 1/2017 | Abudawound et al. |
| 2017/0136445 | A1 | 5/2017 | Ostraat et al. |

OTHER PUBLICATIONS

International Search Report and Written Opinion pertaining to PCT/US2016/060258 dated Mar. 7, 2017.

Hyeon-Lee et al., "Fractal Analysis of Flame-Synthesized Nanostructured Silica and Titania Powders Using Small-Angle X-ray Scattering", Langmuir 1998, 5751-5756, 14, American Chemical Society.

Keskinen et al., "On-Line Characterization of Morphology and Water Adsorption on Fumed Silica Nanoparticles", Aerosol Science and Technology, 2011, 1441-1447, 45, American Association for Aerosol Research.

Lin et al., "Aerosol Processing of Low-Cost Mesoporous Silica Spherical Particles from Photonic Industrial Waste Powder for C02 Capture", Chemical Engineering Journal, 2012, 215-222, 197, Elsevier B.V.

Lu et al., "Aerosol-Assisted Self-Assembly of Mesostructured Spherical Nanoparticles", Nature, 1999, vol. 398, Macmillan Magazines Ltd.

Bhuiyan et al., "Metathesis of 2-Butene to Propylene over W-Mesoporous Molecular Sieves: A Comparative Study Between Tungsten Containing MCM-41 and SBA-15", Applied Catalysis A: General, 2013, 467, 224-234, Elsevier.

Bhuiyan et al., "Kinetics Modelling of 2-Butene Metathesis over Tungsten Oxide Containing Mesoporous Silica Catalyst", The Canadian Journal of Chemical Engineering, 2014, 92, 1271-1282, Canadian Society for Chemical Engineering.

Debecker et al., "Aerosol Route to Nanostructured WO3-SiO2—Al2O3 Metathesis Catalysts: Toward Higher Propene Yield", Applied Catalysis A: General, 2014, 470, 458-466, Elsevier.

Debecker et al., "Flame-Made MoO3/SiO2—Al2o3 Metathesis Catalysts with highly Dispersed and Highly Active Molybdate Species", Journal of Catalysis, 2011, 277, 154-163, Elsevier.

Bukhovko et al., "Continuous Aerosol Flow Reactors for the Controlled Synthesis of heterogeneous Catalyst Particles", AIChE Annual Meeting, Nov. 8-13, 2015.

Debecker et al., "A Non-Hydrolytic Sol-Gel Route to Highly Active MoO2—SiO2—Al2O3 metathesis Catalysts", Catalysis Science & Technology, 2012, 2:6, 1075-1294, RSC Publishing.

Liu et al., "Alumina with Various pore Structures Prepared by Spray Pyrolysis of Inorganic Aluminum Precursors", I&EC Research, 2013, 52, 13377-13383, ACS Publications.

Ishihara et al., "Hydrocracking of 1-methylnaphthalene/ decahydronaphthalene mixture catalyzed by zeolite-alumina composite supported NiMo catalysts", Fuel Processing Technology 116, pp. 222-227, 2013.

Xie et al., "An Overview of Recent Development in Composite Catalysts from Porous Materials for Various Reactions and Processes", Int. J. Mol. Sci. 11, pp. 2152-2187, 2010.

International Search Report and Written Opinion relating to PCT/US2017/030014, dated Jul. 11, 2017.

\* cited by examiner

METHODS FOR PROCESSING FUMED METALLIC OXIDES

BACKGROUND

Embodiments of the present disclosure generally relate to methods for processing fumed metallic oxides. More specifically, embodiments of the present disclosure relate to methods for processing fumed metallic oxides that exhibit a dominantly branched morphology into metallic oxide agglomerations that exhibit a dominantly globular morphology.

BRIEF SUMMARY

The present applicant has recognized that fumed metallic oxides, such as "fumed silica" (fumed silicon dioxide, $SiO_2$) and "fumed alumina" (fumed aluminum oxide, $Al_2O_3$), can be used in a wide variety of applications, including use as adhesives, pharmaceutical and food additives, beauty and skin care products, ink toners, and coatings. Fumed metallic oxides are, in some embodiments, fine white powders with high surface area that become colorless when dispersed in a liquid or polymer. They can be very versatile, exhibit a high degree of purity, and may provide added benefits to compositions, including, but not limited to, thickening properties, anti-sagging reinforcement, scratch and abrasion resistance, corrosion resistance, anti-caking properties, increased flowability, and increased adsorption. However, the present applicant has also recognized that fumed metallic oxides may, in some embodiments, exhibit a very high fractal dimension and a dominantly branched morphology, which can create difficulties in handling, dispensing, storing, and conveying the fumed oxide. Additionally, fumed metallic oxides may pose serious inhalation risks due to their propensity to become airborne and potentially break apart into nanoscale primary particles. Accordingly, the present applicant has recognized an ongoing need to reduce the inhalation risks and handling difficulties of fumed metallic oxides without sacrificing the high surface area and other desirable properties.

In accordance with one embodiment of the present disclosure, a method for processing fumed silica into silica agglomerations is provided. The method may include providing fumed silica particles, combining the particles with a liquid carrier to form a solution of suspended fumed silica particles, atomizing the solution, and subjecting the atomized droplets to a temperature range to remove the liquid carrier and produce the silica agglomerations. The provided fumed silica may have a Brunauer Emmett Teller surface area of greater than about 50 meters squared per gram ($m^2/g$), a dominant branched morphology comprising from 5 nanometer (nm) to 50 nm primary particles, and an average bulk density of less than 64 kilograms per cubic meter ($kg/m^3$). The solution of suspended fumed silica particles may comprise from about 2 weight percent (wt %) to about 8 wt % of the fumed silica particles. Similarly, at least a majority of the silica-containing droplets may have a droplet diameter of about 250 nm to about 100 micrometers ($\mu m$) and a fumed silica particle weight percentage of from about 2 wt % to about 8 wt %. The droplets may be subjected to a temperature of from about 50° C. to about 1500° C. for a period of time of at least about 0.5 seconds to produce silica agglomerations. Substantially all of the produced silica agglomerations may exhibit a second BET surface area that is at least about 75% of the BET surface area of the fumed silica particles and may have a dominant globular morphology characterized by an average bulk density of greater than 64 $kg/m^3$.

In accordance with another embodiment of the present disclosure, a method for processing fumed metallic oxides into metallic oxide agglomerations is provided. The method may include providing fumed metallic oxide particles, combining the particles with a liquid carrier to form a solution of suspended fumed metallic oxide particles, atomizing the solution, and subjecting the atomized droplets to a temperature range to remove the liquid carrier and produce the metallic oxide agglomerations. The provided fumed metallic oxide particles may have a Brunauer Emmett Teller surface area of greater than about 50 $m^2/g$ and a dominant branched morphology comprising from 5 nm to 50 nm primary particles. The solution of suspended fumed metallic oxide particles may comprise from about 2 wt % to about 8 wt % of the fumed metallic oxide particles. Similarly, at least a majority of the metallic oxide-containing droplets may have a droplet diameter of about 250 nm to about 100 micrometers ($\mu m$) and a fumed metallic oxide particle weight percentage of from about 2 wt % to about 8 wt %. The droplets may be subjected to a temperature of from about 50° C. to about 1500° C. for a period of time of at least about 0.5 seconds to produce metallic oxide agglomerations. Substantially all of the produced metallic oxide agglomerations may exhibit a second BET surface area that is at least about 75% of the BET surface area of the fumed metallic oxide particles, and may have a dominant globular morphology.

Although the concepts of the present disclosure are described herein with primary reference to some specific processing assembly configurations, it is contemplated that a wide variety of processing assembly configurations will be suitable for the processing methodology disclosed herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
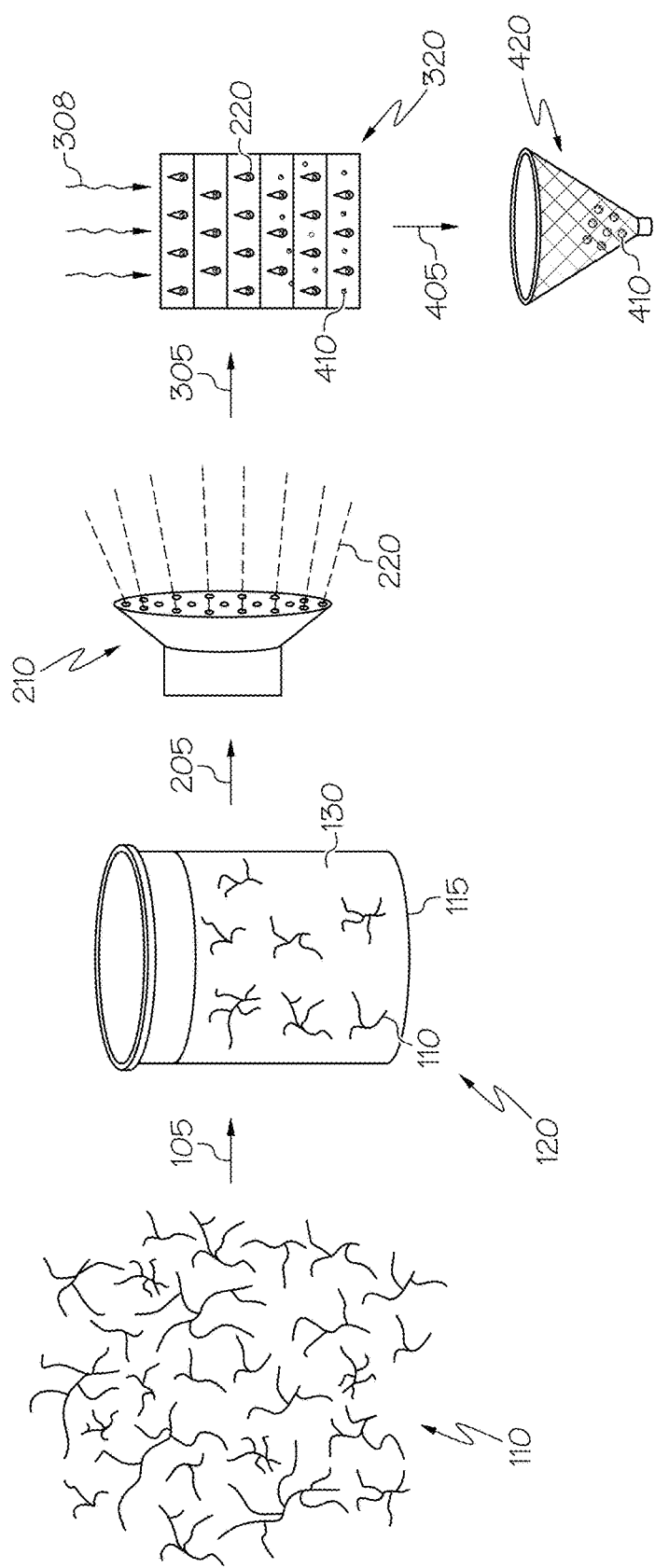
FIG. 1 is a schematic view of a method for processing fumed metal oxides, according to embodiments shown and described herein.

The following description of the embodiments is exemplary and illustrative in nature and is in no way intended to be limiting it its application or use. Reference will now be made in detail to embodiments and methods for producing metallic oxide agglomerations, examples of which are illustrated in the accompanying drawings. As mentioned above, whenever possible, the same reference numerals will be used throughout the drawings to refer to the same or like parts. Specific embodiments will now be described with references to the figures.

FIG. 1 is a schematic view of a method for processing fumed metal oxides, according to embodiments of the present disclosure. As used herein, "fumed" refers to one or more particles generated in a high-temperature, vapor-phase process involving hydrolysis of a volatile composition comprising at least one metal or metalloid such as in a flame of hydrogen and oxygen. For example, fumed silica may be generated by a pyrogenic process such as vapor phase hydrolysis or pyrolysis of silicon tetrachloride at a temperature of about 1800° C. to produce fumed silica particles, which may comprise numerous nanometer-sized primary particles that may be aggregated and agglomerated to form larger clusters with chain-like structures. Commercial examples of fumed metallic oxide particles 110 may include, but are not limited to, CAB-O-SIL TS-610 and ULTRABON 4740 fumed silica (available from Cabot Corporation, Boston, Mass., USA) and AEROSIL fumed silica and AEROXIDE Alu fumed alumina (available from Evonik Corporation, Essen Germany).

FIG. 1 depicts a schematic view of a method comprising providing fumed metallic oxide particles 110, which may undergo a combining step 105 to mix the fumed metallic oxide particles 110 with a liquid carrier 130 to form a solution of suspended fumed metallic oxide particles 120. In some embodiments, the fumed metallic oxide particles 110 may comprise silicon dioxide ($SiO_2$, "silica"), aluminum oxide ($Al_2O_3$, "alumina"), titanium oxide ($TiO_2$), cerium oxide ($CeO_2$), boron trioxide ($B_2O_3$), zirconium dioxide ($ZrO_2$), germanium dioxide ($GeO_2$), tungsten trioxide ($WO_3$), niobium pentaoxide ($Nb_2O_5$), or combinations thereof. Alternatively, other metallic or bi-metallic oxides may be used.

The fumed metallic oxide particles 110 may have a Brunauer Emmett Teller (BET) surface area of greater than about 50 meters squared per gram ($m^2/g$). As used herein, "BET surface area" refers to the average surface area of the metallic oxide particles as measured by the BET (Brunauer Emmett Teller) nitrogen absorption method according to ASTM D-6556. In some embodiments, the fumed metallic oxide particles 110 may have a BET surface area of greater than about 100 $m^2/g$, or greater than about 150 $m^2/g$, or 200 $m^2/g$, or 250 $m^2/g$. For instance, the fumed metallic oxide particles 110 may have a BET surface area of from about 50 $m^2/g$ to about 650 $m^2/g$, or from about 200 $m^2/g$ to about 600 $m^2/g$, or from about 250 $m^2/g$ to about 650 $m^2/g$, or from about 350 $m^2/g$ to about 650 $m^2/g$. In some embodiments, the fumed metallic oxide particles 110 may have a BET surface area of from about 50 $m^2/g$ to about 600 $m^2/g$, or from about 50 $m^2/g$ to about 500 $m^2/g$, or from about 50 $m^2/g$ to about 400 $m^2/g$. The fumed metallic oxide particles 110 may, in some embodiments, have a BET surface area of from about 150 $m^2/g$ to about 450 $m^2/g$, or from about 250 $m^2/g$ to about 450 $m^2/g$, or from about 200 $m^2/g$ to about 500 $m^2/g$, or from about 350 $m^2/g$ to about 600 $m^2/g$, or from about 300 $m^2/g$ to about 500 $m^2/g$. Having a high BET surface area may be commercially desired. Further, fumed metallic oxide particles 110 having a high BET surface area may allow the produced metallic oxide agglomerations 410 to retain the high surface area of the fumed metallic oxide particles 110.

In one or more embodiments, the fumed metallic oxide particles 110 may be characterized by a dominant branched morphology comprising from about 5 nanometer (nm) to about 50 nm primary particles. As used herein, "dominant branched morphology" refers to a particle in which branched, subdivided portions of the particle make up a majority of the dimensional surface extremities of the particle. In some embodiments, the fumed metallic oxide particles 110 may have primary particles from about 10 nm to about 50 nm, or from about 15 nm to about 50 nm, or from about 25 nm to about 50 nm, or from about 35 nm to about 50 nm, or from about 10 nm to about 40 nm, or from about 10 nm to about 30 nm, or from about 10 nm to about 20 nm, or from about 25 nm to about 45 nm. The size of the primary particles may be important to allow the fumed metallic oxide particles 110 to be sufficiently branched so as to exhibit a high BET surface area. The average primary particle size should be high enough to allow for increased BET surface area (such as above about 5 nm) but should not be too high (such as above about 50 nm) to where the fumed metallic oxide particles 110 exhibit more of a straight chain morphology rather than branched.

Referring still to FIG. 1, the provided fumed metallic oxide particles 110 may undergo a combining step 105 in which they are combined with a liquid carrier 130 to form a solution of suspended fumed metallic oxide particles 120. As used herein, "solution of suspended fumed metallic oxide particles" refers to a suspension of fumed metallic oxide particles in which fumed metallic oxide particles 110 are dispersed throughout the solution. In some embodiments, the solution of suspended fumed metallic oxide particles 120 may be a colloidal suspension, meaning that the fumed metallic oxide particles 110 may not substantially settle to the bottom of the solution, but may remain a suspension in which the fumed metallic oxide particles 110 are dispersed throughout the solution. In other embodiments, the fumed metallic oxide particles 110 may settle to the bottom of the liquid carrier 130 and may require energy (such as stirring or sonication) to resuspend the fumed metallic oxide particles 110 in the liquid carrier 130 to regenerate the solution of suspended fumed metallic oxide particles 120.

The liquid carrier 130 may be any liquid suitable to combine with the fumed metallic oxide particles 110 to support a suspension. In some embodiments, the liquid carrier 130 may be an organic or inorganic solvent. For instance, the liquid carrier 130 may comprise $H_2O$, and, in some embodiments, the liquid carrier 130 may be water. Alternatively, the liquid carrier 130 may comprise supercritical carbon dioxide ("$scCO_2$") or an alcohol. It should be understood that while the solvent is termed a "liquid" carrier 130, the solvent may, in some embodiments, comprise a supercritical fluid, which does not have a distinct liquid or gas phase. As used herein, "supercritical" refers to a substance at a pressure and a temperature above that of its critical point, such that distinct phases do not exist and the substance may exhibit the diffusion of a gas while dissolving materials like a liquid. In some embodiments, organic solvents may not be as desirable as a liquid carrier 130 due to potential formation of volatile organic compounds (VOCs), which can be a health hazard. In some embodiments, ultrapure water, including but not limited to distilled or deionized water, may be used as the liquid carrier 130 to produce resulting metallic oxide agglomerations 410 with a substantially unchanged chemical composition. The ultrapure water may not react with the fumed metallic oxide particles 110 and may evaporate without leaving a residue on the produced metallic oxide agglomerations 410. The liquid carrier 130 may be selected such that the produced metallic oxide agglomerations 410 exhibit a high purity, such that they have substantially the same chemical composition as the provided fumed metallic oxide particles 110. In some embodiments, the produced metallic oxide agglomerations 410 may be comprised of less than about 2 wt % of impurities. In other embodiments, the metallic oxide agglomerations 410 may be comprised of less than 5 wt % impurities, or less than 3 wt % impurities, or less than 1 wt % impurities, or less than 0.5 wt % impurities.

In some embodiments, the method may comprise doping the solution of suspended fumed metallic oxide particles 120 such that the produced metallic oxide agglomerations 410 do not have substantially the same chemical composition as the provided fumed metallic oxide particles 110. In some embodiments, the doping step may comprise selecting the liquid carrier 130 such that the produced metallic oxide agglomerations 410 do not have substantially the same chemical composition as the provided fumed metallic oxide particles 110 but rather are altered by the introduction or one or more substances. For instance, the solution of suspended fumed metallic oxide particles 120 may be doped with a doping agent. As used herein, "doping agent" refers to an element or molecule inserted into or onto a substance to alter the chemical, electrical, or optical properties of the substance. In some embodiments, the doping may result in that the produced metallic oxide agglomerations 410 may not have substantially the same chemical composition as the provided fumed metallic oxide particles 110. In some embodiments, the doping agent may comprise a trace impurity inserted in very low quantities to alter the chemical, electrical, or optical properties of the produced metallic oxide agglomerations 410. The liquid carrier 130 may comprise one or more doping agents, such as two or more or three or more doping agents. In some embodiments, the doping step may comprise introducing a carrier gas to the solution of suspended fumed metallic oxide particles 120 such that the produced metallic oxide agglomerations 410 do not have substantially the same chemical composition as the provided fumed metallic oxide particles 110. In some embodiments, one or more carrier gases may be introduced to the solution of suspended fumed metallic oxide particles 120 to dope the produced metallic oxide agglomerations 410. The gases could include, but are not limited to, nitrogen, silane, phosgene, or combinations thereof. Solid doping agents could include, for example, semiconducting quantum dots or other colloidal nanoparticles. Liquid doping agents could include dissolved metal salts, such as $AgNO_3$, NaCl, or $Al(NO_3)_3$.

Still referring to FIG. 1, the solution of suspended fumed metallic oxide particles 120 is shown enclosed in a container 115. The container 115 is not required but may facilitate the combining of the fumed metallic oxide particles 110 and the liquid carrier 130. The container 115 may be a beaker or flask if the method is conducted on a smaller scale or may be a barrel, drum, vat, or reactor if the method is conducted on a larger, industrial scale.

The solution of suspended fumed metallic oxide particles 120 may comprise from about 2 wt % to about 8 wt % fumed metallic oxide particles 110. In some embodiments, the solution of suspended fumed metallic oxide particles 120 may comprise from about 4 wt % to about 8 wt %, or from about 3 wt % to about 8 wt %, or from about 2 wt % to about 7 wt %, or from about 3 wt % to about 6 wt %, or from about 4 wt % to about 7 wt %, or from about 5 wt % to about 7 wt % fumed metallic oxide particles 110 suspended in the liquid carrier 130. The solution of suspended fumed metallic oxide particles 120 may comprise about 6 wt % fumed metallic oxide particles 110, or may comprise about 1.5 wt %, or about 2 wt %, or about 3 wt %, or about 5 wt %, or about 7 wt %, or about 10 wt %, or about 12 wt % fumed metallic oxide particles 110.

As shown in FIG. 1, the method may include atomizing the solution of suspended fumed metallic oxide particles 120 to produce metallic oxide-containing droplets 220. During the atomization step 205, an atomizer 210 may atomize the suspended fumed metallic oxide particles 120 to produce metallic oxide-containing droplets 220. In some embodiments, the atomizer 210 may be an aerosolizer, a spray dryer, a spray nozzle, an ultrasonic transducer, a nebulizer, an aerosol spray, or other atomizing means. The atomizing step 205 may comprise aerosolizing, spray drying, using an ultrasonic transducer, or any combination thereof, to produce the metallic oxide-containing droplets 220. The type of atomizer 210 used may be important in producing the desired metallic oxide-containing droplet 220 size. In some embodiments, atomization may comprise injecting a carrier gas into the solution of suspended fumed metallic oxide particles 120. The carrier gas may, in some embodiments, be selected from the group consisting of nitrogen, argon, air, helium or combinations thereof. In some embodiments, the carrier gas may be one or more inert gases or a combination of gases. In some embodiments, the carrier gas could contain one or more reactive gases.

In some embodiments, the atomized metallic oxide-containing droplets 220 may be characterized by a droplet diameter of from about 250 nm to about 100 micrometers (μm). In other embodiments, the metallic oxide-containing droplets 220 may have a droplet diameter of from about 250 nm to about 50 μm, or from about 250 nm to about 10 μm, or from about 250 nm to about 1 μm, or from about 250 nm to about 500 nm. In one or more embodiments, the metallic oxide-containing droplets 220 may have a droplet diameter of from about 300 nm to about 50 μm, or from about 500 nm to about 50 μm, or from about 1 μm to about 50 μm, or from about 5 μm to about 50 μm, or from about 15 μm to about 50 μm. The metallic oxide-containing droplets 220 may have a droplet diameter of from about 300 nm to about 5 μm, or from about 500 nm to about 5 μm, or from about 1 μm to about 25 μm, or from about 250 nm to about 500 nm, or from about 250 nm to about 750 nm. The droplet size may be central to the rearrangement of the fumed metallic oxide particles 110. The metallic oxide-containing droplets 220 may need to be large enough to permit the fumed metallic oxide particles 110 to rearrange, but cannot be too large such that the fumed metallic oxide particles 110 are spaced too far apart from one another, which may require large amounts energy to move or rearrange the fumed metallic oxide particles 110.

In some embodiments, the metallic oxide-containing droplets 220 may be characterized by a fumed metallic oxide particle 110 weight percentage of from about 2 wt % to about 8 wt %. The fumed metallic oxide particles 110 may alternatively comprise from about 4 wt % to about 8 wt %, or from about 3 wt % to about 8 wt %, or from about 2 wt % to about 7 wt %, or from about 3 wt % to about 7 wt %, or from about 4 wt % to about 7 wt %, or from about 5 wt % to about 7 wt % fumed metallic oxide particles 110. For example the metallic oxide-containing droplets 220 may comprise about 6 wt % fumed metallic oxide particles 110, or may comprise about 2 wt %, or about 3 wt %, or about 6 wt %, or about 7 wt %, or about 10 wt %, or about 12 wt % fumed metallic oxide particles 110. The amount of fumed metallic oxide particles 110 in the metallic oxide-containing droplets 220 may be important to producing the metallic oxide agglomerations 410, as too many fumed metallic oxide particles 110 may not properly rearrange into a globular morphology due to the increased amount of energy required to rearrange the fumed metallic oxide particles 110. Likewise, too few fumed metallic oxide particles 110 may not be sufficient to rearrange into a globular morphology and therefore may remain branched and substantially unchanged from the starting fumed metallic oxide particles 110.

Referring again to FIG. 1, the metallic oxide-containing droplets 220 may be subjected to a temperature of from about 50° C. to about 1500° C. for a period of time of at least about 0.5 seconds to substantially remove the liquid carrier 130 from the metallic oxide-containing droplets 220 to produce metallic oxide agglomerations 410. In some embodiments, the subjecting may be a drying step 305 in which the liquid carrier 130 is removed. In some embodiments, the metallic oxide-containing droplets 220 may be subjected to heat 308 at a temperature of from about 50° C. to about 1400° C., or from about 50° C. to about 1200° C., or from about 50° C. to about 1000° C. In some embodiments, the metallic oxide-containing droplets 220 may be subjected to heat 308 at a temperature of at least about 800° C., at least about 850° C., at least about 900° C., at least about 1000° C., or at least about 1200° C. The metallic oxide-containing droplets 220 may, in some embodiments, be subjected to a temperature of from about 800° C. to about 1500° C., or from about 850° C. to about 1500° C., or from about 850° C. to about 1200° C., or from about 650° C. to about 1400° C., or from about 450° C. to about 1400° C., or from about 250° C. to about 1400° C., or from about 150° C. to about 1400° C. The temperature range in which the metallic oxide-containing droplets 220 are subjected to may be novel, as typically, fumed metallic oxide particles 110 are not processed at high temperatures, as they may crystallize or sinter, generating a typically irreversible crystalline compound, which may not exhibit an increased BET surface area due to the highly ordered nature of crystalline structures or the reduced surface area of a more spherically sintered particle. Without being bound by theory, the present method may include drying the metallic oxide-containing droplets 220 at extremely high temperatures without risk of crystallization, due to the unique step of atomization, the metallic oxide-containing droplet 220 size, the concentration of fumed metallic oxide particles 110 in each metallic oxide-containing droplet 220, and the amount of time and temperature used to dry the liquid carrier 130 from the metallic oxide-containing droplets 220. In some embodiments, the metallic oxide-containing droplets 220 may be subjected to the temperature for a period of time of at least about 0.5 seconds, 1 second, or at least about 2 seconds, or at least about 3 seconds, or at least about 5 seconds, or at least about 30 seconds, or at least about 1 minute. In some embodiments, the metallic oxide-containing droplets 220 may be subjected to the temperature for a period of time of at least about 2 minutes, or at least about 3 minutes, or at least about 5 minutes. The amount of time required may depend on the temperature used and the size of the droplets produced. In some embodiments, the metallic oxide-containing droplets 220 may be subjected to the temperature for a period of time of at least about 0.5 seconds to allow the fumed metallic oxide particles 110 to rearrange inside the metallic oxide-containing droplets 220, which may not occur if heat 308 is applied for less than 0.5 seconds, such as flash heat.

Without being bound by theory, in some embodiments, the metallic oxide-containing droplets 220 may comprise fumed metallic oxide particles 110, which may rearrange inside of the metallic oxide-containing droplets 220 when subjected to the previously-mentioned temperature range. Upon drying the liquid carrier 130, metallic oxide agglomerations 410 may form, which may be dominantly globular in morphology. As used herein, "dominant globular morphology" refers to a particle that is free of branched portions greater than about 5 nm and which exhibits a rounded shape at the majority of the dimensional surface extremities of the particle.

In some embodiments, substantially all of the produced metallic oxide agglomerations 410 may exhibit a dominant globular morphology and a BET surface area that is at least about 75% of the BET surface area of the BET surface area of the fumed metallic oxide particles 110. In some embodiments, the metallic oxide agglomerations 410 may exhibit a BET surface area that is at least about 80% of the BET surface are of the fumed metallic oxide particles 110, or at least about 85%, or at least about 90%, or at least about 95%. Due to their dominantly globular morphology, the produced metallic oxide agglomerations 410 may have a reduced propensity to aerosolize when compared to the fumed metallic oxide particles 110. The metallic oxide agglomerations 410 may not pose a serious inhalation risk and may be easier to handle and process without incurring additional health risks. The metallic oxide agglomerations 410 may retain the amorphous chemistry of the fumed metallic oxide particles 110 such that the chemical composition and purity and the properties of the fumed metallic oxide particles 110 are substantially maintained in the produced metallic oxide agglomerations 410.

In some embodiments, the method may further comprise a collecting step 405 in which the metallic oxide agglomerations 410, or at least a majority of the produced metallic oxide agglomerations 410, are collected by filtration, condensation, or other means. It should be understood that the collecting step 405 may not be necessary in one or more embodiments. In some embodiments, the metallic oxide agglomerations 410 may be collected with a filter 420. The filter 420 may comprise a bag filter, a vacuum filter, a sieve, a membrane, or any other means of separating and collecting the metallic oxide agglomerations 410. While the filter 420 is depicted as conical in nature, which may be representative of a Büchner or Hirsch funnel, it should be understood that the filter 420 may comprise any size or shape known to those skilled in art. Alternatively or additionally, the metallic oxide agglomerations 410 may be collected via condensation, such as through a condensation collector, through impaction, or through a cyclone separator.

In one or more embodiments, the processing method may be substantially reversible, such that the metallic oxide agglomerations 410 may be reverted back into a solution of suspended fumed metallic oxide particles 120. In some embodiments, the method may comprise redispersing the metallic oxide agglomerations 410 in the liquid carrier 130 to form a solution of suspended fumed metallic oxide particles 120. The liquid carrier 130 may, in some embodiments, comprise water, solvent, or a mixture of multiple liquids. As discussed above, the liquid carrier 130 may be an organic or inorganic solvent.

Figure 2:
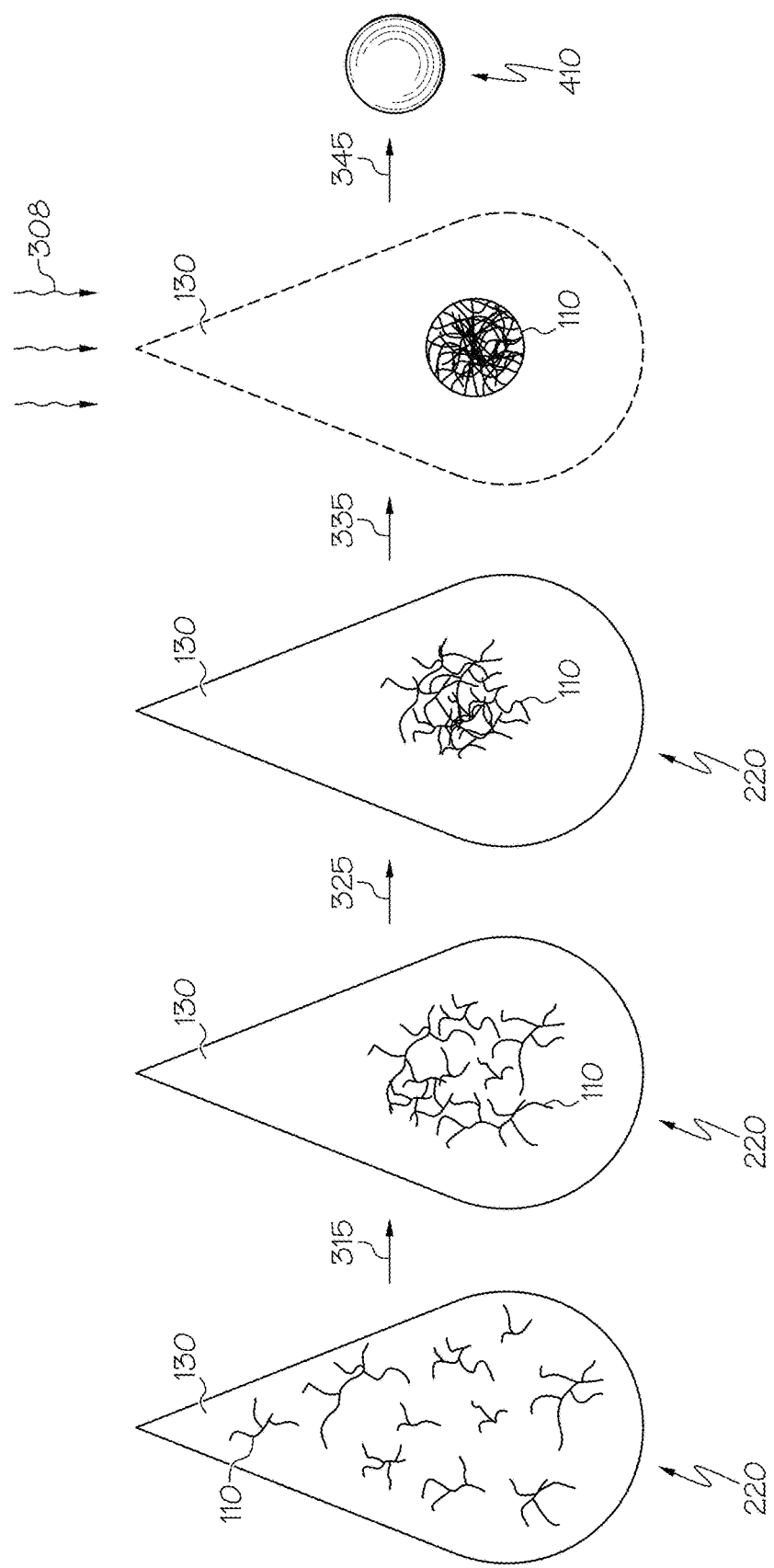
FIG. 2 is a magnified schematic view of a metallic oxide-containing droplet, according to embodiments shown and described herein.
Figure 3:
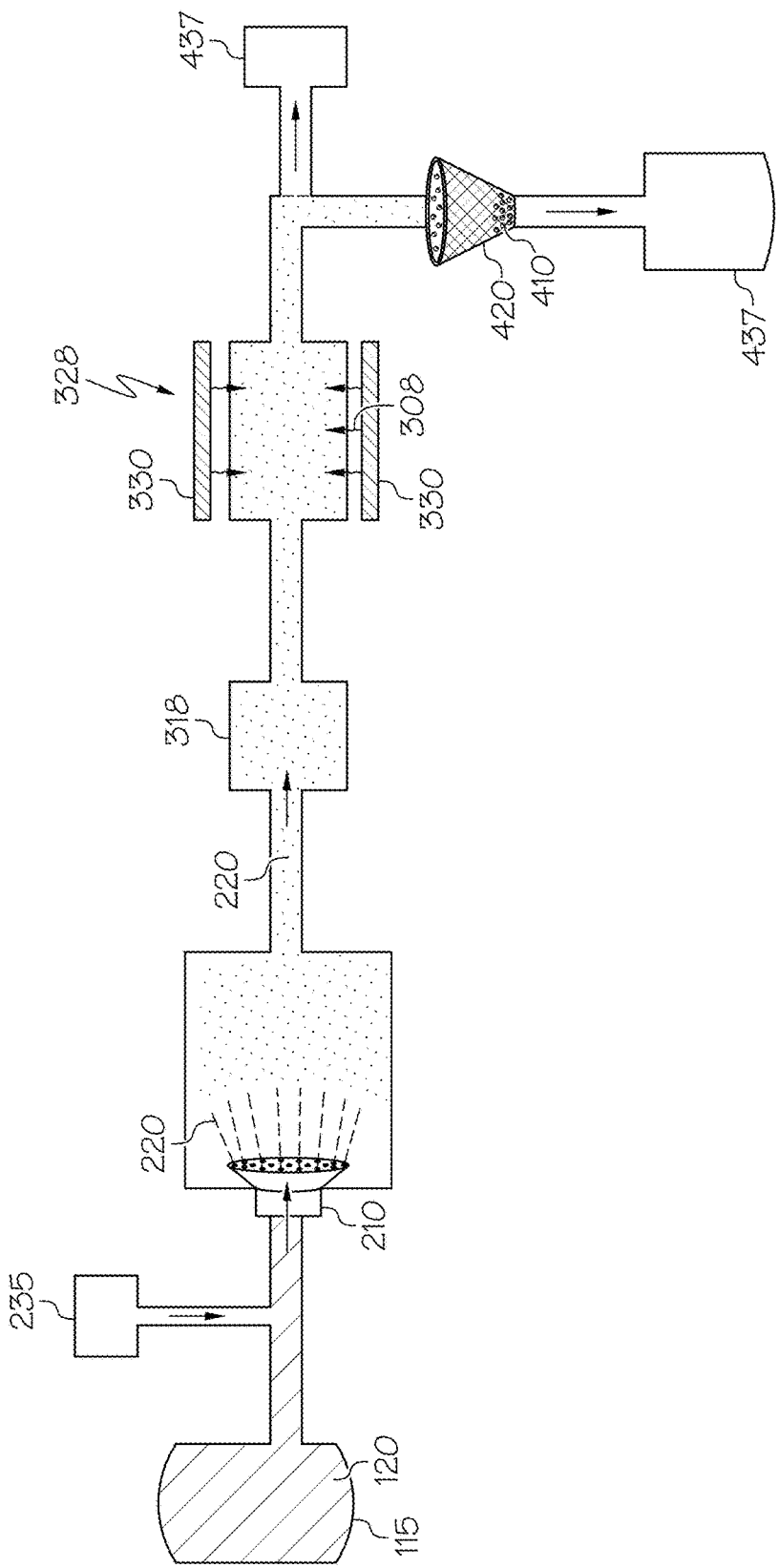
FIG. 3 is a magnified schematic view of a method for processing fumed metal oxides, according to embodiments shown and described herein.

Referring now to FIG. 2, FIG. 2 is a magnified schematic view of a method for processing fumed metal oxides according to embodiments shown and described herein. Without being bound by theory, FIG. 2 depicts rearrangement steps 315, 325, 335 of the metallic oxide-containing droplets 220 as the fumed metallic oxide particles 110 rearrange to produce the metallic oxide agglomerations 410. It should be understood that while the metallic oxide-containing droplets 220 are depicted in a tear-drop shape, the metallic oxide-containing droplets 220 may be any shape, such as spherical in nature. In some embodiments, the rearrangement steps 315, 325, 335, may occur after the atomization step 205, shown in FIG. 1.

Figure 4A:
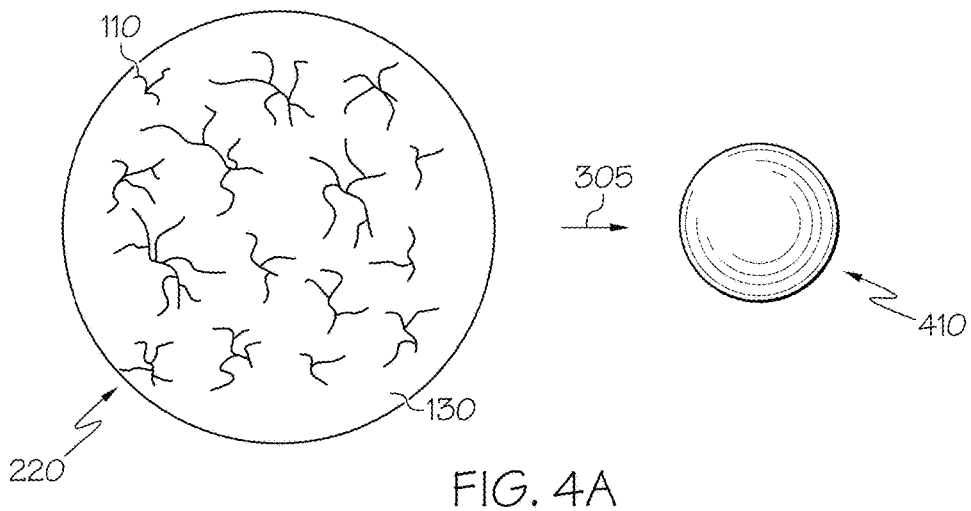
FIG. 4A is a magnified schematic view of a metallic oxide-containing droplet, according to embodiments shown and described herein.
Figure 4B:
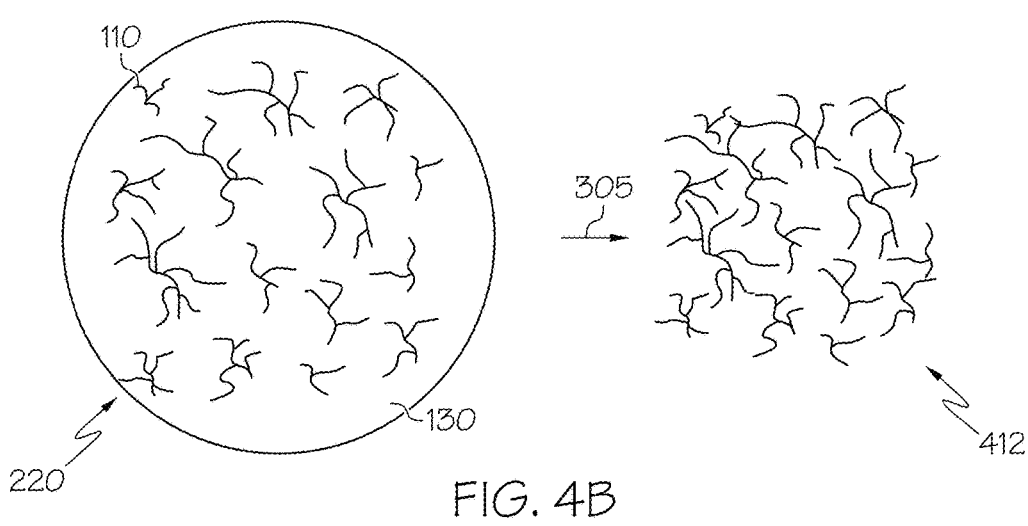
FIG. 4B is a magnified schematic view of a metallic oxide-containing droplet.

In one or more embodiments, immediately following the atomization step 205, the fumed metallic oxide particles 110 may be dispersed in the liquid carrier 130. Following atomization, the fumed metallic oxide particles 110 may begin to undergo a first rearranging step 315. In some embodiments, the first rearranging step 315 may begin upon subjecting the metallic oxide-containing droplets 220 to a temperature of from about 50° C. to about 1500° C., as discussed above. Without being bound by theory, in the first rearranging step 315, the fumed metallic oxide particles 110 may begin to rearrange and densify. Through the passage of time, the increase in temperature, or both, the metallic oxide-containing droplets 220 may undergo a second rearranging step 325 and even may undergo a final rearranging step 335 to further rearrange before undergoing a densifying step 345 into a globular morphology. In some embodiments the liquid carrier 130 may be substantially removed during the densifying step 345, or after the densifying step 345. In some embodiments, the liquid carrier 130 may be removed from the metallic oxide-containing droplets 220 through evaporation, which may include applying heat 308 to the metallic oxide-containing droplets 220. In other embodiments, the metallic oxide-containing droplets 220 may be vaporized, chemically or physically separated from the produced metallic oxide agglomerations 410, or, in some embodiments, may be further reacted to form gaseous species. The removal of the liquid carrier 130 is represented in FIG. 2 by dashed lines. Upon removal of the liquid carrier 130, a metallic oxide agglomeration 410 may be produced. The concentric circular lines on the metallic oxide agglomeration 410 shown in FIG. 2 are used to depict the globular morphology of the metallic oxide agglomerations 410. Additionally, it should be understood that the rearrangement steps 315, 325, 335 may occur simultaneously and are merely depicted as separate formation steps for ease in understanding the rearrangement process.

Referring now to FIG. 3, FIG. 3 is a schematic view of a method for processing fumed metal oxides according to embodiments shown and described herein, depicted as a larger-scale, industrialized process. Like FIG. 1, a solution of suspended fumed metallic oxide particles 120 may be contained in a container 115. The solution of suspended fumed metallic oxide particles 120 may be atomized by an atomizer 210 to produce metallic oxide-containing droplets 220. In some embodiments, a carrier 235 may be injected into the solution of suspended fumed metallic oxide particles 120 to propel the solution through the atomizer 210. In some embodiments, the carrier 235 may be injected air, a liquid aerosol, or a carrier gas, such as helium, argon, air, or nitrogen gas. While hydrogen gas may be suitable, it may not be desired due to explosion concerns. After atomization, the metallic oxide-containing droplets 220 may continue to a drier 318, to a heater 328, or to both. The drier 318 may only provide air at about ambient room temperature (such as at about 21° C.), unlike the heater 328, which may supply heat 308 to remove solvent from the metallic oxide-containing droplets 220. In some embodiments, the heater 328 may be a tube furnace in which one or more heating coils 330 may be used to generate heat 308. In some embodiments, the subjecting step may comprise passing the metallic oxide-containing droplets 220 through a tube furnace. In some embodiments, the metallic oxide-containing droplets 220 may be passed through a furnace at a flow rate of from about 0.1 liters per minute (L/min) to about 500 L/min. Alternatively, the flow rate may be from about 1 L/min to about 5 L/min, or from about 3 L/min to about 25 L/min. The flow rate may be about 5 L/min, about 25 L/min, about 50 L/min, about 100 L/min, about 250 L/min, or about 500 L/min. The heater 328 may, in some embodiments, use electric heating, infrared heating, convection heating, immersion heating, hydraulic heating, or other heating means.

In some embodiments, a carrier 235 may be used to propel the metallic oxide-containing droplets 220 through the drier 318, the heater 328, or both. The carrier 235 may be a carrier gas, as discussed above, which may comprise nitrogen, helium, hydrogen, argon, air, combinations thereof, inert gas, or a reactive gas. The carrier 235 may be injected into the solution of suspended fumed metallic oxide particles 120, the metallic oxide-containing droplets 220, or both. In some embodiments, the injection of a carrier 235 may aid in the movement of the particles throughout the processing components. In one or more embodiments, a vacuum 437 may alternatively or additionally be applied to propel the metallic oxide-containing droplets 220 through the drier 318, the heater 328, or to a filter 420, which may collect the metallic oxide agglomerations 410. As mentioned above, in some embodiments, the metallic oxide agglomerations 410 may not be filtered but may be collected through other means.

Referring now to FIG. 4, FIG. 4 is a magnified schematic view of a method for processing fumed metal oxides, according to embodiments shown and described herein. FIG. 4 shows three metallic oxide-containing droplets 220 undergoing a drying step 305. FIG. 4A depicts the drying step 305 occurring at a temperature and for an amount of time according to embodiments shown and described herein, such as the temperature and time ranges discussed above in reference to FIG. 1, which successfully produces a metallic oxide agglomerations 410.

FIG. 4B depicts a method in which the metallic oxide-containing droplet 220 undergoes drying step 305 too quickly or at too high of a temperature. For instance, the metallic oxide-containing droplet 220 in FIG. 4B may be dried for less than 0.5 seconds, or at a temperature above 1500° C., such as being subjected to flash heat. Because the liquid carrier 130 is dried too quickly, the fumed metallic oxide particles 110 do not have sufficient time to rearrange and coalesce into the desired metallic oxide agglomerations 410. As shown in FIG. 4A, and discussed above, the metallic oxide agglomerations 410 may have a dominant globular morphology. The metallic oxide cluster 412 produced in 4B, unlike the desired metallic oxide agglomerates, may not have a dominantly globular morphology. The metallic oxide cluster 412 may, in some embodiments, continue to exhibit a dominantly branched morphology that is similar to the fumed metallic oxide particles 110, with from about 5 nm to about 50 nm average primary particles.

Figure 4C:
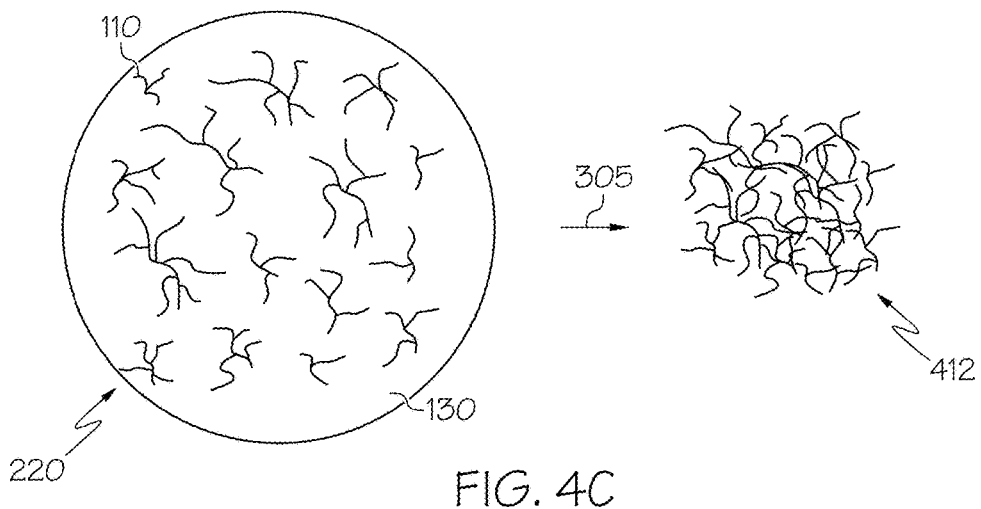
FIG. 4C is a magnified schematic view of a metallic oxide-containing droplet.

FIG. 4C depicts a method in which the metallic oxide-containing droplet 220 undergoing a drying step 305 at too low of a temperature. At too low of a temperature, such as a temperature of less than about 50° C., the fumed metallic oxide particles 110 in the metallic oxide-containing droplet 220 may rearrange at too slow of a rate. In some embodiments, the lowered temperature may cause the liquid carrier 130 to not be fully removed, causing the fumed metallic oxide particles 110 to remain as a suspension. When collected, these metallic oxide clusters 412 may not exhibit or retain a globular structure and the metallic oxide clusters 412 reverts to its original geometry of the fumed metallic oxide particles 110. While some densification may occur, the metallic oxide cluster 412 produced may not have as pronounced of a globular morphology or as high of a bulk density as compared to the desired metallic oxide agglomerations 410.

Figure 5A:
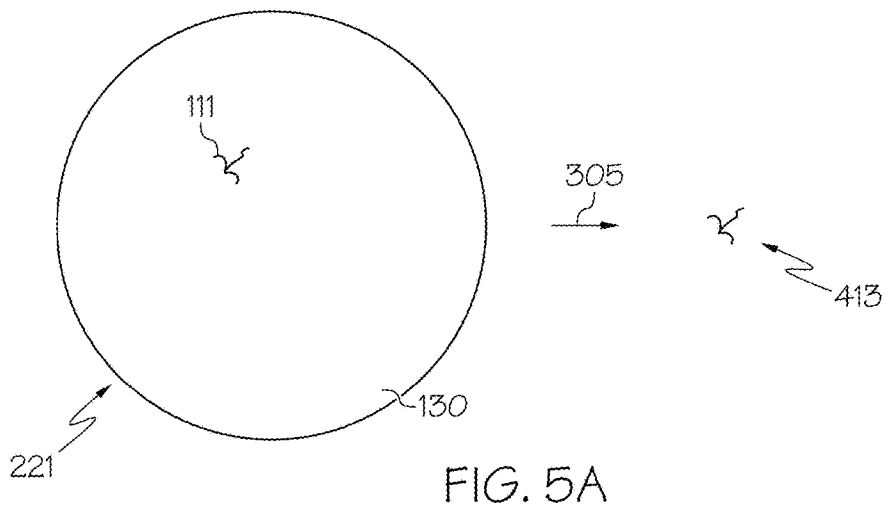
FIG. 5A is a magnified schematic view of a silica-containing droplet.
Figure 5B:
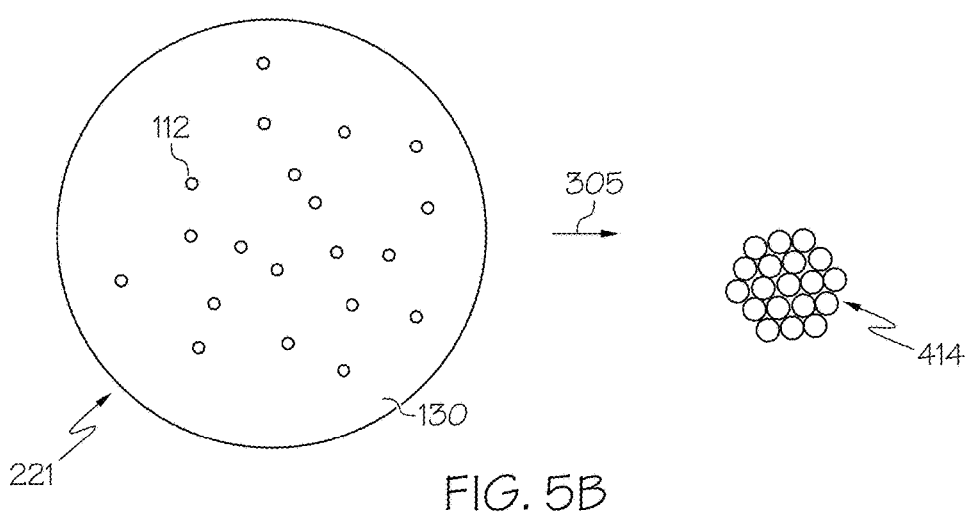
FIG. 5B is a magnified schematic view of a silica-containing droplet.

FIG. 5 is a magnified schematic view of a method for processing fumed silica. FIG. 5 shows the importance of the concentration of fumed silica particles 111 within the silica-containing droplet 221, as discussed above. While FIG. 5 depicts silica, it should be understood that any metallic or bi-metallic oxide may be used. FIG. 5A depicts three silica-containing droplets 221 undergoing a drying step 305. As shown in FIG. 5A, if the silica-containing droplet 221 does not comprise fumed silica particles 111 that are sufficiently branched, such as fumed silica particles 111 with a primary particle size of from about 5 nm to about 50 nm, as discussed above, silica agglomerations 411 may not be produced. Instead, a silica cluster 412 may form, as shown in FIG. 5A, which may not exhibit a globular morphology but instead may retain the branched morphology of the original fumed silica particles 111, or as shown in FIG. 5B, a silica nanoparticle aggregate 414 may form, which may not retain a high BET surface area.

In FIG. 5B, like FIG. 5A, if the silica-containing droplets 221 do not comprise fumed silica particles 111 that are sufficiently branched, such as nanoscale silica particles 112, silica agglomerations 411 may not be produced. Instead, silica nanoparticle aggregates 414 may be produced, which do not exhibit a desirable BET surface area, but instead, may be smooth nanoscale particles with little BET surface area. Without retaining a desirable BET surface area, such as a BET surface area of at least about 75% of the BET surface area of the starting fumed silica particles 111 as the produced silica agglomerations 411 exhibit, the produced silica nanoparticle aggregates 414 may not be commercially desirable.

Figure 5C:
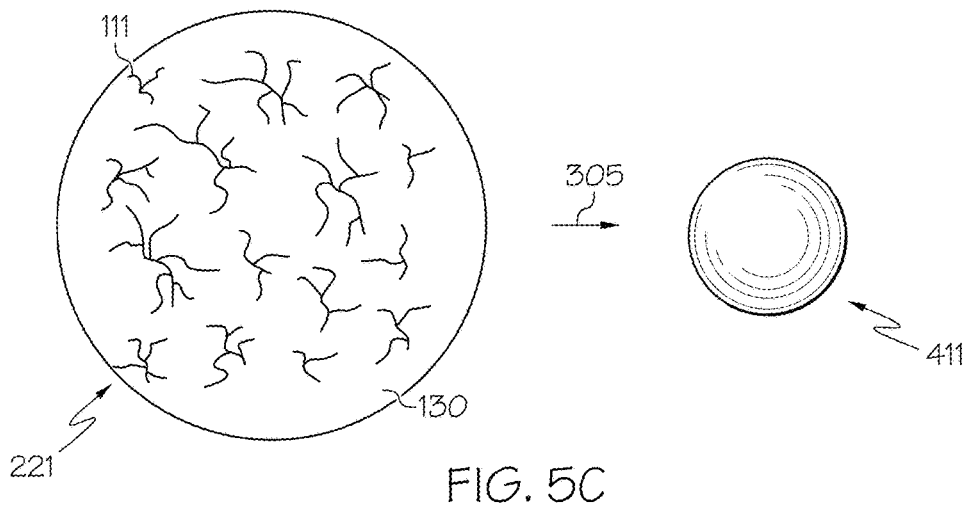
FIG. 5C is a magnified schematic view of a silica-containing droplet in accordance with embodiments shown and described herein.

In contrast, FIG. 5C depicts the production of a silica agglomerations 411 produced by the methods shown and described herein. In FIG. 5C, fumed silica particles 111 are provided, wherein the fumed silica particles 111 have a BET surface area of greater than about 50 meters m$^2$/g and are characterized by a dominant branched morphology comprising from 5 nm to 50 nm primary particles, with an average bulk density of less than 64 kilograms per cubic meter (kg/m$^3$). In one or more embodiments, the fumed silica particles 111 may be characterized by an average bulk density of less than 64 kilograms per cubic meter (kg/m$^3$) which is equivalent to about 4 pounds per cubic foot (lbs/ft$^3$). As used herein, "average bulk density" refers to the average weight of a unit volume of a loose material, such as the metallic oxide particles, to the same volume of water in kilograms per cubic meter (kg/m$^3$) or pounds per cubic foot (lbs/ft$^3$). The fumed silica particles 111 may have an average bulk density of less than 60 kg/m$^3$, or less than 55 kg/m$^3$, or less than 50 kg/m$^3$, or less than 45 kg/m$^3$, or less than 30 kg/m$^3$. The fumed metallic oxide particles 110 may have an average bulk density of from 45 kg/m$^3$ to 64 kg/m$^3$, or from 45 kg/m$^3$ to 60 kg/m$^3$, or from 45 kg/m$^3$ to 55 kg/m$^3$, or from 30/m$^3$ to 64 kg/m$^3$, or from 30/m$^3$ to 60 kg/m$^3$, or from 30/m$^3$ to 55 kg/m$^3$, or from 30/m$^3$ to 50 kg/m$^3$, or from 30/m$^3$ to 45 kg/m$^3$. The fumed silica particles 111 may have an average bulk density of less than 3 lbs/ft$^3$, less than 2 lbs/ft$^3$, or less than 1 lbs/ft$^3$. The bulk density of the starting fumed silica particles 111 may provide sufficient branching, and thus, increased BET surface area, as discussed above. If the starting fumed silica particles 111 have too high of an average bulk density, such as an average bulk density over about 64 kg/m$^3$, the fumed metallic oxide particles 110 may be too compacted to properly rearrange and coalesce into the desired silica agglomerations 411.

Again referring to FIG. 5C, the fumed silica particles 111 may be combined with a liquid carrier 130 to form a solution of suspended fumed silica particles 121. The solution of suspended fumed silica particles 121 may comprise from about 2 wt % to about 8 wt % of the fumed silica particles 111 and may be atomized to produce silica-containing droplets 221. At least a majority of the silica-containing droplets 221 may be characterized by a droplet diameter of about 250 nm to about 100 μm and a fumed silica particle 111 weight percentage of from about 2 wt % to about 8 wt %. The silica-containing droplets 221 may be subjected to a temperature of from about 50° C. to about 1500° C. for a period of time of at least about 0.5 seconds to substantially remove the liquid carrier 130 from the silica-containing droplets 221 to produce the silica agglomerations 411. Substantially all of the produced silica agglomerations 411 may exhibit a BET surface area that is at least about 75% of the BET surface area of the fumed silica particles 111 and a dominant globular morphology characterized by an average bulk density of greater than about 64 kg/m$^3$.

Figure 6A:
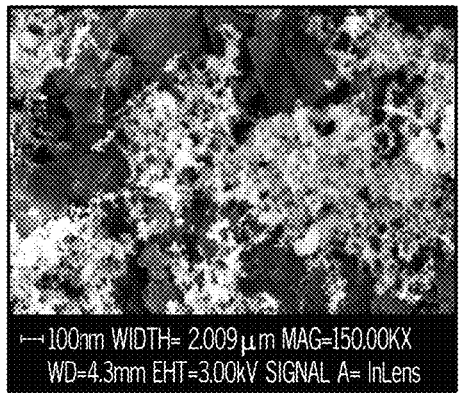
FIG. 6A is an image of fumed silica particles, as viewed by a scanning electron microscope.
Figure 6B:
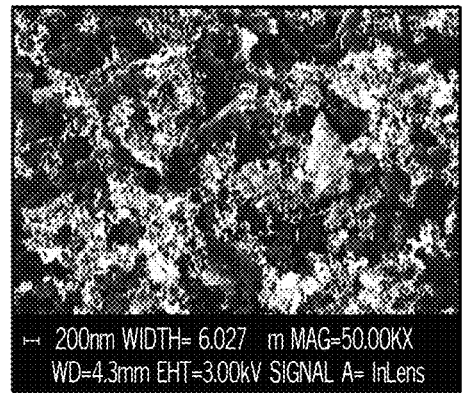
FIG. 6B is an image of fumed silica particles, as viewed by a scanning electron microscope.
Figure 6C:
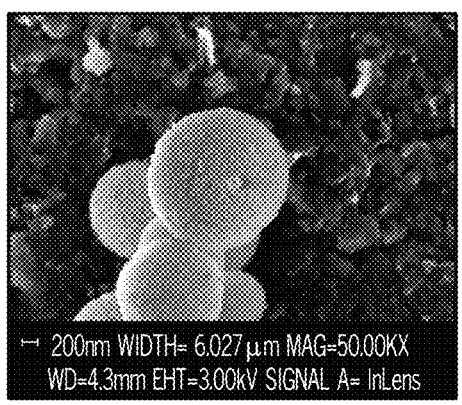
FIG. 6C is an image of silica agglomerations, as viewed by a scanning electron microscope, according to embodiments shown and described herein.
Figure 6D:
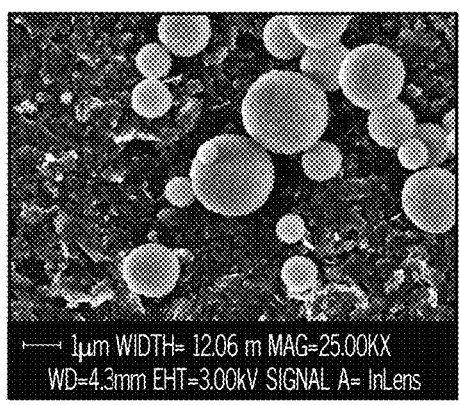
FIG. 6D is another image of silica agglomerations, as viewed by a scanning electron microscope, according to embodiments shown and described herein.
Figure 6E:
FIG. 6E is an image of a silica agglomeration, as viewed by a scanning electron microscope, according to embodiments shown and described herein.
Figure 6F:
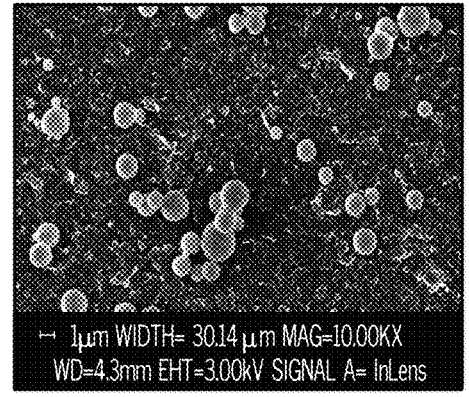
FIG. 6F is another image of a silica agglomeration, as viewed by a scanning electron microscope, according to embodiments shown and described herein.

FIGS. 6A to 6F are scanning electron microscope (SEM) images of fumed silica particles 111 before processing in accordance with the methods shown and described herein, as well as produced silica agglomerates 411 produced by the methods shown and described herein. FIGS. 6A and 6B are SEM images of fumed silica particles 111. It should be understood that while fumed silica particles 111 are depicted, any fumed metallic oxide particles 110 may be used. As shown in FIGS. 6A and 6B, the fumed silica particles 111 are extremely fractal and are highly branched. Without being bound by theory, the branched nature of the fumed silica particles 111 may create a "dusty" environment, as the particles are easily aerosolized, which may create an inhalation hazard. The propensity to aerosolize may be exacerbated by the potential for the fumed silica particles 111 to break down into their primary nanoscale particles, particularly when exposed to surfactants and liquid forces, such as those in the human body and, more particularly, the lungs. The dusty nature of the fumed silica particles 111 may pose serious health risks during handling and transporting the fumed silica particles 111 and steps may need to be taken to reduce inhalation hazards, such as requiring individuals in the area to wear masks.

FIGS. 6C, 6D, 6E and 6F show the drastic morphological effects of the methods of processing fumed silica according to embodiments shown and described herein. As shown in FIGS. 6C, 6D, 6E and 6F, the produced silica agglomerations 411 have a dominantly globular morphology. The SEM images of FIGS. 6C, 6D, 6E and 6F further depict the ability of the produced silica agglomerations 411 to retain at least a high portion of the BET surface area of the starting fumed silica particles 111, as the silica agglomerations 411 may not smooth so as to provide an increased BET surface area.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

EXAMPLES

In order that the embodiments may be more easily understood, reference is made to the following examples, which are intended to illustrate embodiments disclosed and described herein. The examples are in no ways limiting in scope.

Fumed silica (silicon oxide, $SiO_2$) was processed according to embodiments shown and described herein to produce silica agglomerates with a globular morphology. As depicted in Table 1, below, fumed silica commercially available from Evonik and Strem Chemicals was mixed with deionized water to form a solution of suspended fumed silica particles. The solution was atomized using an ultrasonic transducer. The droplet size was varied to produce the desired % wt of solid fumed silica particles present in the droplets. The droplets were dried to remove the deionized water at varying residence times and flow rates by flowing the liquid aerosol through a tube furnace for the time and temperatures listed below.

The BET surface area of Evonik and Strem fumed silica is listed as being around 200 $m^2/g$, however the BET of the starting fumed silica particles were measured to be between 207 and 214 $m^2/g$. For the BET surface area retention percentages depicted in Table 3, the highest measured value of 214 $m^2/g$ was used to ensure accuracy. All of the resulting silica agglomerations were characterized as amorphous by x-ray diffraction analysis. Notably, as shown below in Table 3, the resulting silica agglomerates all retained extraordinarily high BET surface areas, with some samples within over 90% BET surface area retention. As shown in Comparative Example 3, if the percent weight of solids in the atomized droplets is too low, such as below 2 wt %, as discussed above, the BET surface area of the produced agglomerate may not retain 75% of the BET surface area of the starting fumed oxide.

TABLE 1

Processing of Fumed Silica into Silica Agglomerates

| Sample Name | Fumed Metallic Oxide | Fumed Silica (g) | DI water (g) | % wt solids in droplets | Res. Time (s) | Flow Rate (L/min) | Temp. (° C.) | BET of Fumed Oxide ($m^2/g$) | BET of Product ($m^2/g$) |
|---|---|---|---|---|---|---|---|---|---|
| Ex. 1 | Silica[1] | 64 | 1000 | 6 | 1.39 | 5 | 1000 | 207-214 | 196.5 |
| Ex. 2 | Silica[1] | 64 | 1000 | 6 | 1.39 | 5 | 1400 | 207-214 | 182.4 |
| Comp. Ex. 3 | Silica[1] | 15.95 | 1000 | 1.5 | 3.17 | 30 | 1000 | 207-214 | 133.2 |
| Ex. 4 | Silica[1] | 31.9 | 1000 | 3 | 3.17 | 30 | 1000 | 207-214 | 203.2 |

[1]Strem Chemicals Fumed Silica, 0.012 micron, 200 BET Surface Area ($m^2/g$)

Similarly, fumed alumina was also processed according to embodiments of the methods shown and described herein. Fumed alumina, commercially available from Evonik Chemicals was mixed with deionized water to form a solution of suspended fumed alumina particles. The solution was atomized using an ultrasonic transducer. The droplet size was varied to produce the desired % wt of solid fumed alumina particles present in the droplets. The droplets were dried to remove the deionized water at varying residence times and flow rates by flowing the liquid aerosol through a tube furnace for the time and temperatures listed below. All of the resulting alumina agglomerations were characterized as amorphous by x-ray diffraction analysis. Notably, as shown below in Table 3, the resulting alumina agglomerates all retained extraordinarily high BET surface areas, with some samples within over 90% BET surface area retention.

TABLE 2

Processing of Fumed Alumina into Alumina Agglomerates

| Sample | Fumed Metallic Oxide | Fumed Alumina (g) | DI water (g) | % wt solids in droplets | Res. Time (s) | Flow Rate (L/min) | Temp. (° C.) | BET of Fumed Oxide ($m^2/g$) | BET of Product ($m^2/g$) |
|---|---|---|---|---|---|---|---|---|---|
| Ex. 5 | Alumina[2] | 63.8 | 1000 | 6 | 1.39 | 5 | 1000 | 126 | 130.9 |
| Ex. 6 | Alumina[2] | 63.8 | 1000 | 6 | 1.39 | 5 | 1400 | 126 | 104.3 |

[2]Evonik Aeroxide Alu 130, 110-150 BET Surface Area ($m^2/g$)

Finally, a mixture of fumed metallic oxides was also processed according to embodiments of the methods shown and described herein. Fumed alumina, commercially available from Evonik Chemicals, and fumed silica, commercially available from Sigma Aldrich and Evokik Chemicals, was mixed with deionized water to form a solution of suspended fumed oxide particles. The solution was atomized using an ultrasonic transducer. The droplet size was varied to produce the desired % wt of solid fumed mixed oxide particles present in the droplets. The droplets were dried to remove the deionized water at varying residence times and flow rates by flowing the liquid aerosol through a tube furnace for the time and temperatures listed below. All of the resulting mixed oxide agglomerations were characterized as amorphous by x-ray diffraction analysis. Notably, as shown below in Table 3, the resulting mixed oxide agglomerates all retained extraordinarily high BET surface areas, with some samples within over 80% BET surface area retention.

TABLE 3

Processing Mixed Metallic Oxides into Metallic Oxide Agglomerates

| Sample | Fumed Metallic Oxides | Fumed Silica (g) | Fumed Alumina (g) | Ratio ($SiO_2$:$Al_2O_3$) | DI water (g) | % wt solids in droplets | Res. Time (s) | Flow Rate (L/min) | Temp. (° C.) | BET of Product ($m^2/g$) |
|---|---|---|---|---|---|---|---|---|---|---|
| Ex. 7 | Silica[3] & Alumina[4] | 47.4 | 0.967 | 98:2 | 1564 | 3 | 1.39 | 5 | 1000 | 315.9 |
| Ex. 8 | Silica[5] & Alumina[4] | 49.95 | 2.629 | 95:5 | 1700 | 3 | 7.61 | 12.5 | 1000 | 336.8 |
| Ex. 9 | Silica[5] & Alumina[4] | 49.95 | 2.629 | 95:5 | 1700 | 3 | 3.81 | 25 | 1000 | 363.1 |

[3]Sigma-Aldrich Fumed Silica, 0.007 microns, 395 ± 25 BET Surface Area ($m^2/g$)
[4]Evonik Aeroxide Alu 130, 110-150 BET Surface Area ($m^2/g$)
[5]Evonik Aerosil Fumed Silica, 350-410 BET Surface Area ($m^2/g$)

TABLE 4

BET Surface Area Retention

| Sample | Starting BET Surface Area ($m^2/g$) | Ending BET Surface Area ($m^2/g$) | % BET Surface Area Retention |
|---|---|---|---|
| Ex. 1 | Up to 214 | 196.5 | 91.82% |
| Ex. 2 | Up to 214 | 182.4 | 85.23% |
| Ex. 3 | Up to 214 | 133.2 | 62.24% |
| Ex. 4 | Up to 214 | 203.2 | 94.95% |
| Ex. 5 | Up to 150 | 130.9 | 87.27% |
| Ex. 6 | 126 | 104.3 | 82.78% |
| Ex. 7 | Up to 415 | 315.9 | 76.12% |
| Ex. 8 | Up to 410 | 336.8 | 82.15% |
| Ex. 9 | Up to 410 | 363.1 | 88.56% |

As shown in Table 4, the methods of the present disclosure may allow for the production of metallic oxide agglomerations that exhibit a dominantly globular morphology to reduce the inhalation risks presented by fumed metallic oxide particles, but retain the desired properties of their fumed counterparts, such as a high BET surface area. As shown above, the produced metallic oxide agglomerates may have a BET surface area retention of at least about 75%, at least about 80%, at least about 85%, at least about 90%, or even at least about 95%.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It should be noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for processing fumed silica into silica agglomerations comprising:
   providing fumed silica particles, wherein the fumed silica particles have a first Brunauer Emmett Teller (BET) surface area of greater than about 50 meters squared per gram ($m^2/g$), and are characterized by a dominant branched morphology comprising from 5 nanometer (nm) to 50 nm primary particles, with an average bulk density of less than 64 kilograms per cubic meter ($kg/m^3$);
   combining the fumed silica particles with a liquid carrier to form a solution of suspended fumed silica particles, wherein the solution of suspended fumed silica particles comprises from about 2 weight percent (wt %) to about 8 wt % of the fumed silica particles;
   atomizing the solution of suspended fumed silica particles to produce silica-containing droplets, wherein at least a majority of the silica-containing droplets are characterized by a droplet diameter of about 250 nm to about 100 micrometers (μm) and a fumed silica particle weight percentage of from about 2 wt % to about 8 wt %; and
   subjecting the silica-containing droplets to a temperature of from about 50° C. to about 1500° C. for a period of time of at least about 0.5 seconds to substantially remove the liquid carrier from the silica-containing droplets to produce the silica agglomerations, wherein substantially all of the produced silica agglomerations exhibit a second BET surface area that is at least about 75% of the first BET surface area, and a dominant globular morphology characterized by an average bulk density of greater than 64 $kg/m^3$.

2. The method of claim 1, wherein the method further comprises collecting at least a majority of the produced silica agglomerations by filtration or condensation.

3. The method of claim 1, wherein the atomizing step comprises aerosolizing, spray drying, using an ultrasonic transducer, or any combination thereof, to produce the silica-containing droplets.

4. The method of claim 1, wherein the atomizing step comprises injecting a carrier gas into the solution of suspended fumed silica particles.

5. The method of claim 4, wherein the carrier gas is selected from the group consisting of nitrogen, air, or combinations thereof.

6. The method of claim 1, wherein the liquid carrier is selected such that the produced silica agglomerations have substantially the same chemical composition as the provided fumed silica particles, wherein the produced silica agglomerations are comprised of less than about 2 wt % of impurities.

7. The method of claim 1, wherein the liquid carrier is comprised of $H_2O$.

8. The method of claim 1, wherein the method comprises doping the solution of suspended fumed silica particles such that the produced silica agglomerations do not have substantially the same chemical composition as the provided fumed silica particles.

9. The method of claim 8, wherein the doping step comprises selecting the liquid carrier such that the produced silica agglomerations do not have substantially the same chemical composition as the provided fumed silica particles.

10. The method of claim 8, wherein the doping step comprises introducing a carrier gas to the solution of suspended fumed silica particles such that the produced silica agglomerations do not have substantially the same chemical composition as the provided fumed silica particles.

11. The method of claim 1, wherein the fumed silica particles have a first BET surface area from about 200 $m^2/g$ to about 600 $m^2/g$.

12. The method of claim 1, wherein substantially all of the produced silica agglomerations exhibit a second BET surface area that is at least about 90% of the first BET surface area.

13. The method of claim 1, wherein the silica-containing droplets comprise from about 3 wt % to about 6 wt % of fumed silica particles.

14. The method of claim 1, wherein the solution of suspended fumed silica particles comprises from about 3 wt % to about 6 wt % of fumed silica particles.

15. The method of claim 1, wherein the silica-containing droplets comprise about 6 wt % of fumed silica particles.

16. The method of claim 1, wherein the solution of suspended fumed silica particles comprises about 6 wt % of fumed silica particles.

17. The method of claim 1, wherein the silica-containing droplets are subjected to a temperature of from about 400° C. to about 1500° C.

18. The method of claim 1, wherein the subjecting step comprises passing the silica-containing droplets through a tube furnace.

19. The method of claim 18, wherein the subjecting step comprises passing the silica-containing droplets through a tube furnace at a flow rate of from about 3 liters per minute (L/min) to about 50 L/min.

20. The method of claim 1, wherein the method is substantially reversible, such that the silica agglomerations may be reverted into a solution of suspended fumed silica particles.

21. The method of claim 1, further comprising, redispersing the silica agglomerations into the liquid carrier to form a solution of suspended fumed silica particles, wherein the solution of suspended fumed silica particles comprises from about 2 wt % to about 8 wt % of fumed silica particles.

22. A method for processing fumed metallic oxides comprising:

providing fumed metallic oxide particles, wherein the fumed metallic oxide is selected from the group consisting of $SiO_2$, $Al_2O_3$, $TiO_2$, $CeO_2$, $B_2O_3$, $ZrO_2$, $GeO_2$, $WO_3$, $Nb_2O_5$, and combinations thereof, wherein the fumed metallic oxide particles have a first Brunauer Emmett Teller (BET) surface area of greater than about 50 $m^2/g$, and a dominant branched morphology comprising from 5 nm to 50 nm primary particles;

combining the fumed metallic oxide particles with a liquid carrier to form a solution of suspended fumed metallic oxide particles, wherein the solution of suspended fumed metallic oxide particles comprises from about 2 wt % to about 8 wt % of the fumed metallic oxide particles;

atomizing the solution of suspended fumed metallic oxide particles to produce metallic oxide-containing droplets, wherein at least a majority of the metallic oxide-containing droplets are characterized by a droplet diameter of about 250 nm to about 100 μm and a fumed metallic oxide particle weight percentage of from about 2 wt % to about 8 wt %; and subjecting the metallic oxide-containing droplets to a temperature of from about 50° C. to about 1500° C. for a period of time of at least about 0.5 seconds to substantially remove the liquid carrier from the metallic oxide-containing droplets to produce metallic oxide agglomerations, wherein substantially all of the produced metallic oxide agglomerations exhibit a dominant globular morphology and a second BET surface area that is at least about 75% of the first BET surface area.

23. The method of claim 22, wherein the fumed metallic oxide particles are fumed alumina ($Al_2O_3$) particles and the produced metallic oxide agglomerations are alumina agglomerations.

24. The method of claim 23, wherein the fumed alumina particles have a first BET surface area from about 80 $m^2/g$ to about 150 $m^2/g$.

25. The method of claim 23, wherein the fumed alumina particles have an average bulk density of less than 60 $kg/m^3$ and the produced alumina agglomerations have an average bulk density of greater than 40 $kg/m^3$.

26. The method of claim 22, wherein the fumed metallic oxide is silica ($SiO_2$).

27. The method of claim 22, wherein the fumed metallic oxide is a mixed oxide comprising at least two metallic oxides selected from the group consisting of $SiO_2$, $Al_2O_3$, $TiO_2$, $CeO_2$, $B_2O_3$, $ZrO_2$, $GeO_2$, $WO_3$, and $Nb_2O_5$.

28. A method for processing fumed silica into silica agglomerations comprising:

providing fumed silica particles, wherein the fumed silica particles have a first Brunauer Emmett Teller (BET) surface area of from about 200 $m^2/g$ to about 600 $m^2/g$, and are characterized by a dominant branched morphology comprising from 5 nm to 50 nm primary particles, with an average bulk density of less than 64 kilograms per cubic meter ($kg/m^3$);

combining the fumed silica particles with a liquid carrier to form a solution of suspended fumed silica particles, wherein the solution of suspended fumed silica particles comprises from about 2 weight percent (wt %) to about 8 wt % of the fumed silica particles;

atomizing the solution of suspended fumed silica particles to produce silica-containing droplets, wherein at least a majority of the silica-containing droplets are characterized by a droplet diameter of about 250 nm to about 100 micrometers (μm) and a fumed silica particle weight percentage of from about 2 wt % to about 8 wt %; and subjecting the silica-containing droplets to a temperature of from about 850° C. to about 1500° C. for a period of time of at least about 0.5 seconds to substantially remove the liquid carrier from the silica-containing droplets to produce the silica agglomerations, wherein substantially all of the produced silica agglomerations exhibit a second BET surface area that is at least about 85% of the first BET surface area, and a dominant globular morphology characterized by an average bulk density of greater than 64 kg/m$^3$.

* * * * *